(12) United States Patent
Zhou

(10) Patent No.: US 10,464,119 B2
(45) Date of Patent: Nov. 5, 2019

(54) ROLLING HEAD FOR ROLLING PIPE THREADS, APPARATUS AND PIPE COLUMN BLANK MACHINED BY THE APPARATUS

(71) Applicant: SHANGHAI PAN-CHINA FASTENING SYSTEM CO., LTD., Shanghai (CN)

(72) Inventor: Jun Zhou, Shanghai (CN)

(73) Assignee: SHANGHAI PAN-CHINA FASTENING SYSTEM CO., LTD., Shanghai (CN)

( * ) Notice: Subject to any disclaimer, the term of this patent is extended or adjusted under 35 U.S.C. 154(b) by 521 days.

(21) Appl. No.: 14/434,371

(22) PCT Filed: Oct. 8, 2013

(86) PCT No.: PCT/CN2013/084823
§ 371 (c)(1),
(2) Date: Apr. 8, 2015

(87) PCT Pub. No.: WO2014/056419
PCT Pub. Date: Apr. 17, 2014

(65) Prior Publication Data
US 2015/0258600 A1 Sep. 17, 2015

(30) Foreign Application Priority Data

Oct. 8, 2012 (CN) .......................... 2012 1 0379912

(51) Int. Cl.
*B21H 3/04* (2006.01)
*F16L 9/02* (2006.01)
*F16L 15/00* (2006.01)

(52) U.S. Cl.
CPC ................ *B21H 3/042* (2013.01); *F16L 9/02* (2013.01); *F16L 15/00* (2013.01)

(58) Field of Classification Search
CPC .......... B21H 3/04; B21H 3/042; B21H 3/044; B21H 3/046; B21H 3/048
See application file for complete search history.

(56) References Cited

U.S. PATENT DOCUMENTS 2,011,761 A * 8/1935 Handel .................. B21H 3/044
72/104
2,257,234 A * 9/1941 Gould ...................... B21H 3/04
72/104

(Continued)

FOREIGN PATENT DOCUMENTS

CN 2555962 Y 6/2003
CN 1461679 A 12/2003

(Continued)

OTHER PUBLICATIONS

International Search Report and Written Opinion dated Jan. 23, 2017, issued by the State Intellectual Property Office of the Peoples Republic of China for corresponding International Application No. PCT/CN2013/084823, with English translation (18 pages).

(Continued)

*Primary Examiner* — Gregory D Swiatocha
(74) *Attorney, Agent, or Firm* — Osha Liang LLP

(57) ABSTRACT

A rolling head for rolling pipe threads includes at least two rolling wheels and a rolling wheel seat for positioning the rolling wheels, in which the rolling wheel includes a rolling wheel body and a rolling wheel axle, the rolling wheel body includes a rolling wheel pipe thread forming portion, an axial movement space is present in a direction along the rolling wheel axle of the rolling wheel relative to the rolling wheel seat, an axial distance of the axial movement space is 0.5 thread pitch to 1 thread pitch of a corresponding thread of the rolling wheel pipe thread forming portion.

10 Claims, 15 Drawing Sheets

(56) References Cited

U.S. PATENT DOCUMENTS

| | | | | |
|---|---|---|---|---|
| 2,550,855 A * | 5/1951 | Ostendorf | ............... | B21H 3/048 |
| | | | | 72/104 |
| 2,932,996 A * | 4/1960 | Yamamoto | ............... | B21H 3/04 |
| | | | | 221/266 |
| 2,983,168 A * | 5/1961 | Laban | ................... | B21C 37/207 |
| | | | | 72/107 |
| 3,058,196 A | 10/1962 | Bour | | |
| 3,452,567 A * | 7/1969 | Marcovitch | ............ | B21H 3/044 |
| | | | | 72/121 |
| 3,651,678 A | 3/1972 | Zook et al. | | |
| 4,408,418 A * | 10/1983 | Corrette | ................... | B23G 5/04 |
| | | | | 451/222 |
| 4,617,816 A | 10/1986 | Brinkman | | |
| 4,771,625 A | 9/1988 | Watanabe et al. | | |
| 4,785,649 A | 11/1988 | Watanabe et al. | | |
| 5,699,691 A | 12/1997 | Maruyama | | |
| 5,870,918 A | 2/1999 | Schunk et al. | | |
| 2006/0162411 A1 | 7/2006 | Kubota et al. | | |
| 2010/0284639 A1 * | 11/2010 | Keller | ..................... | B21B 31/07 |
| | | | | 384/428 |
| 2012/0011912 A1 | 1/2012 | Flegel et al. | | |

FOREIGN PATENT DOCUMENTS

| | | | | | |
|---|---|---|---|---|---|
| CN | 1555938 A | 12/2004 | | | |
| CN | 1251821 C | 4/2006 | | | |
| CN | 101209523 A | 7/2008 | | | |
| CN | 100542735 C | 9/2009 | | | |
| CN | 201361668 Y | 12/2009 | | | |
| CN | 201751045 U | 2/2011 | | | |
| CN | 102198590 A | 9/2011 | | | |
| CN | 202316603 U | 7/2012 | | | |
| CN | 103264128 A | 8/2013 | | | |
| EP | 282889 A2 | 9/1988 | | | |
| EP | 0698431 A1 | 2/1996 | | | |
| GB | 892211 A * | 3/1962 | ............ | B21H 3/046 | |
| GB | 1150525 A | 4/1969 | | | |
| JP | H-1273637 A | 11/1989 | | | |
| JP | H-9327742 A | 12/1997 | | | |
| JP | H-10034270 A | 2/1998 | | | |
| JP | H-10244340 A | 9/1998 | | | |
| JP | 2000176585 A | 6/2000 | | | |
| JP | 2003126937 A | 5/2003 | | | |
| JP | 4610375 B2 | 1/2011 | | | |
| RU | 2443492 C1 | 2/2012 | | | |
| SU | 703197 A1 | 12/1979 | | | |
| SU | 722641 A1 | 3/1980 | | | |
| SU | 1344479 A1 | 10/1987 | | | |

OTHER PUBLICATIONS

PCT International Preliminary Report on Patentability and Written Opinion dated Apr. 8, 2015, issued by The International Bureau of WIPO for corresponding International Application No. PCT/CN2013/084823, with English translation (14 pages).

* cited by examiner

ROLLING HEAD FOR ROLLING PIPE THREADS, APPARATUS AND PIPE COLUMN BLANK MACHINED BY THE APPARATUS

CROSS REFERENCE TO RELATED APPLICATIONS

This is a national stage application based on PCT/CN2013/084823, filed on Oct. 8, 2013, which claims priority to Chinese Patent Application No. CN 201210379912.5, filed on Oct. 8, 2012. This application claims the benefits and priority of these prior applications and incorporates their disclosures by reference in their entireties.

BACKGROUND OF INVENTION

Field of the Invention

The present invention relates to steel pipe, pipe fitting and pipe processing fields. In particular, it relates to rolling head for rolling pipe threads, an apparatus thereof, and cylindrical pipe blanks processed by the apparatus.

Background Art

Because rolling pipe threads, as compared with cutting pipe threads, have advantages of high pipe thread mechanical connection strength and good sealing performance, more and more people are paying attention to them. CN200310111695.2 and CN200710106912.7 disclose two processing methods of rolling external pipe threads. They are processing technologies that first performs axial punching conical surface, followed by performing pipe thread rolling processing. Compared with cutting pipe thread technology with one knife forming process, this processing technology requires use of axially moving conical mold machinery (or hydraulic) to press workpiece, which is first processed to form conical surface, and then pipe threads rolled on the conical surface. Otherwise, tooth shape of pipe threads would be incomplete, and pipe body could easily be deformed or even crack.

Currently, at least three problems exist in pipe thread rolling processes as shown below:

1. Due to additional conical surface processing step using large equipment, pipe thread rolling processes, as compared with conventional threading or cutting pipe thread processes, are not only time consuming, but also very inconvenient for pipe network on-site pipe thread processing, thus, unacceptable.

2. Due to huge axially instant punching pressure in forming conical surface, pipe materials, especially welded pipe welded seam materials, are vulnerable to unapparent and apparent damages, and may cause a safety risk to pipe thread products.

3. Because outside diameters of current rolling cylindrical pipe blank are determined by outside diameter of steel pipe for cutting technology, the outside diameters are too large. When forming a conical surface, the conical surface of product inside diameter is often greater than 1:16, or the conical surface length (height) is far greater than the length allowed by the standards, resulting in greater inner hole narrowing amount of rolling pipe thread product than the maximum inside diameter narrowing amount caused by a grand total of standard-allowed steel pipe outside diameter and the maximum deviations of steel pipe wall thickness, may cause certain impact on fluid transport stability.

The reasons for such are design defects in the above two patents caused by using steel pipe standard outside diameter, as formulated by cutting pipe thread technology, to be outside diameter of rolling cylindrical pipe blank.

By the above description and analysis, it is not difficult for us to realize the key to promote this outstanding rolling pipe thread technology is to solve the above problems, especially saving axially punching process step, simplifying processing steps, producing rolling pipe threads in line with national and international standards, and in accordance with current operating practices.

SUMMARY OF INVENTION

An object of the present invention is to provide use of a certain outside diameter of a corresponding cylindrical pipe blank as a standard pipe outside diameter of rolling pipe threads, without using axial moving conical mold machinery (or hydraulic) for punching workpieces to form a conical surface. Only by using a rolling head and apparatus thereof for rolling throughout this process, rolling directly on a cylindrical pipe blank to form scaled conical pipe threads, it provides simple technology for rolling conical pipe thread processing, practical and complete, and is fully in line with current operating practices.

To achieve the above object, the present invention discloses a rolling head for rolling pipe threads, includes at least two rolling wheels and a rolling wheel seat for positioning the rolling wheels, in which the rolling wheel includes a rolling wheel body and a rolling wheel axle. The rolling wheel body includes a rolling wheel pipe thread forming portion, characterized in that, an axial movement space is present in a direction along the rolling wheel axle of the rolling wheel body relative to the rolling wheel seat, an axial distance of the axial movement space is 0.5 thread pitch to 1 thread pitch of a corresponding thread of the rolling wheel pipe thread forming portion.

Preferably, the rolling head for rolling pipe threads of the present invention, characterized in that, a radial movement space is present in a radial direction along the rolling wheel axle of the rolling wheel body relative to the rolling wheel seat, a radial distance of the radial movement space is no more than 0.5 thread pitch of a corresponding thread of the rolling wheel pipe thread forming portion.

Preferably, the rolling head for rolling pipe threads of the present invention, characterized in that, the axial movement space and the radial movement space are achieved through a structure selected from the group consisting of:
a) a floating connection between the rolling wheel and the rolling wheel seat;
b) a floating connection between the rolling wheel body and the rolling wheel axle;
c) a combination of a) and b);
the floating connection is selected from: an axle hole floating connection or an axle bearing floating connection.

Preferably, the rolling head for rolling pipe threads of the present invention, characterized in that, the axial movement space and the radial movement space are achieved through a floating connection between the rolling wheel and the rolling wheel seat, and the rolling wheel body of the rolling wheel and the rolling wheel axle is integrally molded or key-groove mated; the floating connection is selected from: an axle hole floating connection or an axle bearing floating connection.

Preferably, the rolling head for rolling pipe threads of the present invention, characterized in that, the axle hole floating connection includes:

d) a contact connection of any arc surface or all arc surfaces between an axle hole surface of the rolling wheel body and the rolling wheel axle; or e) a contact connection of any arc surface or all arc surfaces at an axle hole connection site between the rolling wheel axle and the rolling wheel seat; or f) a contact connection of an axle hole surface of the rolling wheel body and a surface of the rolling wheel axle, in which both surfaces are cylindrical surfaces, and the diameter of an axle hole port of the rolling wheel body equals to the diameter of the rolling wheel axle plus 0.5 to 1 thread pitch corresponding to a rolling wheel thread;

g) a contact connection of cylindrical surfaces at an axle hole connection site between the rolling wheel axle and the rolling wheel seat, and the diameter of an axle hole port of the rolling wheel seat equals to the diameter of the rolling wheel axle plus 0.5 to 1 thread pitch corresponding to a rolling wheel thread.

Preferably, the rolling head for rolling pipe threads of the present invention, characterized in that, the axle hole floating connection includes:

h) a contact connection of any are surface or all arc surfaces at an axle hole connection site between the rolling wheel axle and the rolling wheel seat; or i) a contact connection of cylindrical surfaces at an axle hole connection site between the rolling wheel axle and the rolling wheel seat, and the diameter of an axle hole port of the rolling wheel seat equals to the diameter of the rolling wheel axle plus 0.5 to 1 thread pitch corresponding to a rolling wheel thread.

Preferably, the rolling head for rolling pipe threads of the present invention, characterized in that, the axle bearing floating connection is through a rolling pin.

Preferably, the rolling head for rolling pipe threads of the present invention, characterized in that, the axle bearing floating connection is through a rolling pin.

Preferably, the rolling head for rolling pipe threads of the present invention, characterized in that, shape of the pipe thread forming portion is a conical pipe thread or a cylindrical pipe thread.

Preferably, the rolling head for rolling pipe threads of the present invention, characterized in that, a front end of the pipe thread forming portion of the rolling wheel body further includes a pre-forming portion, shape of the pre-formed portion includes a cylindrical surface, a conical surface, a cylindrical pipe thread, an incomplete cylindrical pipe thread, an incomplete conical pipe thread, or a combination thereof.

Preferably, the rolling head for rolling pipe threads of the present invention, characterized in that, a front end of the pipe thread forming portion of the rolling wheel body further includes a guide portion, shape of the guide portion includes a cone surface, an arc surface, a progressive surface, or a combination thereof.

Preferably, the rolling head for rolling pipe threads of the present invention, characterized in that, a front end of the pre-forming portion of the rolling wheel body further includes a guide portion, shape of the guide portion includes a cone surface, an arc surface, a progressive surface, or a combination thereof.

Preferably, the rolling head for rolling pipe threads of the present invention, characterized in that, the shape of the guide portion of the rolling wheel is the arc surface, the shape of the pre-forming portion is the cylindrical pipe thread, the shape of the pipe thread forming portion is the conical pipe thread.

Preferably, the rolling head for rolling pipe threads of the present invention, characterized in that, the rolling head includes N number of circular thread rolling wheel, pitch axial length of first incomplete pitch thread of each rolling wheel is set as follows:

j) setting any one of the rolling wheel as a first rolling wheel having a pitch axial length of the first incomplete pitch thread equals to a pitch thereof;

k) sequentially decreasing 1/N pitch of the pitch axial length of a first incomplete pitch thread of a rolling wheel adjacent to the first rolling wheel in a clockwise or a counterclockwise direction until decreasing to 1/N pitch;

in which N is a natural number greater than or equal to 2.

Preferably, the rolling head for rolling pipe threads of the present invention, characterized in that, the guide portion, the pre-forming portion, and the pipe thread forming portion are an integrated structure, or an assembled structure.

The present invention also discloses a pipe thread rolling apparatus having any of the above described rolling heads for processing a cylindrical pipe blank further includes: a base, a power motor, a transmission device, a work clamping device, a hollow main shaft, a motor switch, two axial guide columns, and a sliding seat; in which the power motor, the transmission device, and the motor switch are disposed at one side of a top portion of the base, the hollow main shaft is disposed at a top portion of the power motor, the transmission device connects a main shaft of the power motor with the hollow main shaft; the clamping device is disposed at the top portion of the base for clamping and rotating the cylindrical pipe blank to be processed, in which the clamping device and the hollow main shaft are integrally and coaxially connected; the two axial guide columns are disposed at another side of the top portion of the base, and are disposed before and after in parallel with a center line of the hollow main shaft; the sliding seat is disposed at the two axial guide columns, capable of horizontally sliding along the axial guide columns; the rolling head is floatingly disposed at the sliding seat, and is coaxial with the hollow main shaft.

Preferably, the pipe thread rolling apparatus of the present invention, characterized in that, the rolling wheel seat of the rolling head includes an upper rolling wheel seat and a lower rolling wheel seat, in which the upper rolling wheel seat is a sliding structure, the lower rolling wheel seat is a fixed structure; the rolling wheel seat is floatingly connected with the sliding seat of the rolling apparatus through a spring and a group of adjustment screws; in which the upper rolling wheel seat and the lower rolling wheel seat are each respectively provided with two rolling wheels.

Preferably, the pipe thread rolling apparatus of the present invention, characterized in that, the rolling apparatus further includes a chamfering device and/or a rolling trimming device and/or a photoelectric sensing device; in which the chamfering device is floatingly disposed at the sliding seat opposite to one side of the power motor and the transmission device, and is coaxial with the hollow main shaft; the rolling trimming device is disposed at the sliding seat opposite to one side of the power motor and the transmission device, and is coaxial with the hollow main shaft; the photoelectric sensing device is disposed at the rolling wheel seat of the rolling head.

The present invention also discloses a cylindrical pipe blank processed by any of the above described rolling apparatus, characterized in that, an outside diameter of the cylindrical pipe blank is an average value of a basic large diameter and a basic medium diameter of a conical pipe thread on a reference plane corresponding to international or national standards.

Preferably, the cylindrical pipe blank of the present invention, characterized in that, the cylindrical pipe blank for rolling a 55° conical pipe external thread DN6, a pipe outside diameter is 9.44 mm; the cylindrical pipe blank for rolling a 55° conical pipe external thread DN8, a pipe outside diameter is 12.73 mm; the cylindrical pipe blank for rolling a 55° conical pipe external thread DN10, a pipe outside diameter is 16.23 mm; the cylindrical pipe blank for rolling a 55° conical pipe external thread DN15, a pipe outside diameter is 20.37 mm; the cylindrical pipe blank for rolling a 55° conical pipe external thread DN20, a pipe outside diameter is 25.86 mm; the cylindrical pipe blank for rolling a 55° conical pipe external thread DN25, a pipe outside diameter is 32.51 mm; the cylindrical pipe blank for rolling a 55° conical pipe external thread DN32, a pipe outside diameter is 41.17 mm; the cylindrical pipe blank for rolling a 55° conical pipe external thread DN40, a pipe outside diameter is 47.06 mm; the cylindrical pipe blank for rolling a 55° conical pipe external thread DN50, a pipe outside diameter is 58.87 mm; the cylindrical pipe blank for rolling a 55° conical pipe external thread DN65, a pipe outside diameter is 74.44 mm; the cylindrical pipe blank for rolling a 55° conical pipe external thread DN80, a pipe outside diameter is 87.14 mm; the cylindrical pipe blank for rolling a 55° conical pipe external thread DN100, a pipe outside diameter is 112.29 mm; the cylindrical pipe blank for rolling a 55° conical pipe external thread DN125, a pipe outside diameter is 137.69 mm; the cylindrical pipe blank for rolling a 55° conical pipe external thread DN510, a pipe outside diameter is 163.09 mm; or the cylindrical pipe blank for rolling a 60° conical pipe external thread DN6, a pipe outside diameter is 9.87 mm; the cylindrical pipe blank for rolling a 60° conical pipe external thread DN8, a pipe outside diameter is 13.05 mm; the cylindrical pipe blank for rolling a 60° conical pipe external thread DN10, a pipe outside diameter is 16.49 mm; the cylindrical pipe blank for rolling a 60° conical pipe external thread DN15, a pipe outside diameter is 20.5 mm; the cylindrical pipe blank for rolling a 60° conical pipe external thread DN20, a pipe outside diameter is 25.84 mm; the cylindrical pipe blank for rolling a 60° conical pipe external thread DN25, a pipe outside diameter is 32.34 mm; the cylindrical pipe blank for rolling a 60° conical pipe external thread DN32, a pipe outside diameter is 41.1 mm; the cylindrical pipe blank for rolling a 60° conical pipe external thread DN40, a pipe outside diameter is 47.17 mm; the cylindrical pipe blank for rolling a 60° conical pipe external thread DN50, a pipe outside diameter is 59.21 mm; the cylindrical pipe blank for rolling a 60° conical pipe external thread DN65, a pipe outside diameter is 71.43 mm; the cylindrical pipe blank for rolling a 60° conical pipe external thread DN80, a pipe outside diameter is 87.34 mm; the cylindrical pipe blank for rolling a 60° conical pipe external thread DN90, a pipe outside diameter is 100.05 mm; the cylindrical pipe blank for rolling a 60° conical pipe external thread DN100, a pipe outside diameter is 112.7 mm; the cylindrical pipe blank for rolling a 60° conical pipe external thread DN125, a pipe outside diameter is 139.68 mm; the cylindrical pipe blank for rolling a 60° conical pipe external thread DN150, a pipe outside diameter is 166.52 mm; a dimension tolerance of the pipe outside diameter is a freedom tolerance.

Beneficial effects of the present invention are: using the characteristics of rotary rolling through a rolling head of the present invention for rolling pipe threads, apparatus thereof and cylindrical pipe blank processed by the apparatus, axially punching conical surface processing step is omitted, solving the problems of unapparent and apparent damages to pipe body, especially welded pipe welded seam, caused by punching, achieving a processing method having steps basically consistent with current threading pipe thread technology that has been used for more than 100 years, rendering rolling pipe thread technology simple and practical, and fully in line with current operating practices, making rolling pipe thread processing in pipe network on-site installation possible. At the same time, using pipe thread products formed by cylindrical pipe blank of the present invention, unit weight length thereof is the same as unit weight length of original steel pipe prior to rolling. In addition, due to rolling cold hardening effect, while decreasing steel pipe outside diameter and thinning steel pipe wall thickness, it improves the safety performance of pipe thread connections to ensure stability and fluid transport amount of steel pipe inside diameter, achieving the goal of saving steel in steel pipe in non-demetallation rolling pipe threads processing, saving a considerable amount of steel costs, providing a real low-cost, energy-saving, emission-reducing method.

Using rolling head of the present invention for pipe threads, apparatus thereof, and cylindrical pipe blank processed by the apparatus will give birth to a steel pipe diameter based on an average value of a basic large diameter and a basic medium diameter of a conical pipe thread on a reference plane corresponding to international or national standards; new standards, new materials for thinning pipe wall thickness, promoting energy-saving and emission-reducing in steel industry; opening for upgrade in traditional pipe thread processing apparatus and product manufacturing structure, improving nation's competitiveness in related industries in global markets, revolutionarily upgrading manufacture of pipe construction equipment.

BRIEF DESCRIPTION OF DRAWINGS

Below, referring to the drawings, to one skilled in the art, the detailed description of methods of the present invention, the above and other objects, features and advantages are obvious.

REFERENCE NUMERALS

Figure 1:
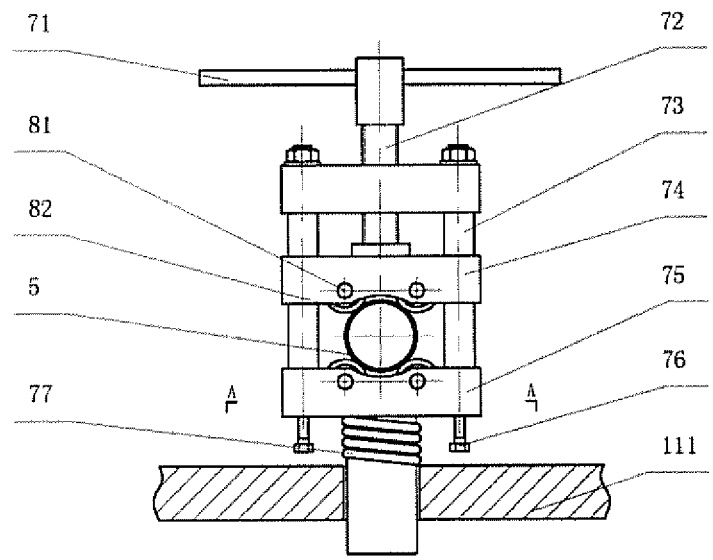
FIGS. 1, 3, and 4 are three rolling heads according to embodiments of the present invention (rolling wheels are equally distributed).

1 Base
2 Power motor
20 Transmission device
21 Hollow main shaft (in power motor transmission device)
3 Motor switch
4 Workpiece clamping device
5 Cylindrical pipe blank
51 Outside diameter of cylindrical pipe blank of the present invention
52 Wall thickness of cylindrical pipe blank of the present invention
53 Inside diameter of cylindrical pipe blank according to national standards
54 Outside diameter of cylindrical pipe blank according to prior art
55 Wall thickness of cylindrical pipe blank according to prior art
56 Inside diameter of cylindrical pipe blank according to national standards
6 Rolling trimming device
7 Rolling head
71 Handle
72 Screw
73 Left and right guide columns
74 Upper rolling wheel seat
741 Photoelectric sensing device
742 Bushings
75 Lower rolling wheel seat
76 Adjustment screw
761 Adjustment screw 1
762 Adjustment screw 2
763 Adjustment screw 3
764 Adjustment screw 4
77 Spring
781 Axial gap
782, 7821, 7822 Radial gaps
8 Rolling wheel
81 Rolling wheel axle
811 Rolling wheel axle 1
812 Rolling wheel axle 2
813 Rolling wheel axle 3
814 Rolling wheel axle 4
815 Flat key
816 Rolling pin
82 Rolling wheel body
821 Rolling wheel body 1
822 Rolling wheel body 2
823 Rolling wheel body 3
824 Rolling wheel body 4
9 Chamfering device
10 Crank (of moving sliding seat)
11 Sliding seat
111 Positioning plate (of sliding seat)
12 Axial guide columns (2)
A Guide portion (of rolling wheel body)
A1 Convex circular surface of guide portion
A2 Conical surface of guide portion
A3 Progressive surface of guide portion
B Preforming portion (of rolling wheel body)
B1 Cylindrical pipe thread of preforming portion
B2 Incomplete conical pipe thread of preforming portion
B3 Cylindrical surface of preforming portion
B4 Incomplete cylindrical pipe thread of preforming portion
Conical pipe thread forming portion (of rolling wheel body)
C1 Axial pitch length of the first incomplete pitch thread of the first rolling wheel body
C2 Axial pitch length of the first incomplete pitch thread of the second rolling wheel body
C3 Axial pitch length of the first incomplete pitch thread of the third rolling wheel body
C4 Axial pitch length of the first incomplete pitch thread of the fourth rolling wheel body

DETAILED DESCRIPTION

The present invention will be described below in detail in combination with preferred embodiments. It should be noted that, in the disclosure described later, although the terms are selected from those commonly known, but some terms are selected based on Applicant's judgment and the detailed meaning thereof should be understood in accordance with the spirit revealed in the present invention.

Rolling head of the present invention refers to device for rolling pipe threads on cylindrical pipe blank. Main components include several rolling wheels for rolling pipe threads and rolling wheel seat for supporting or fixing rolling wheels. The rolling wheels include rolling wheel body that directly contacts with cylindrical pipe blank for forming threads by rolling and rolling wheel axle located at the center of axle hole of rolling wheel body. The rolling wheels are mated with the rolling wheel seats through the rolling wheel axles, and equally distributed surrounding cylindrical pipe blank in the axial direction. If necessary, the rolling heads can also be equipped with mechanical, hydraulic, pneumatic or electric devices, such that the rolling wheel seats and the rolling wheels can move in the radial direction of pre-processing cylindrical tube blank with reasonable rolling pressure and rolling time to adapt rolling process for cylindrical pipe blank having different diameters and materials. If necessary, they can also be equipped with other devices.

Movement spaces of the present invention should be understood as spaces, in which rolling wheel body moves freely. The axial movement space refers to the movement space of the rolling wheel body in the axial direction of the rolling wheel axle. The axial distance of the axial movement space should be understood as the maximum distance of the rolling wheel body capable of moving freely along the axial direction of the rolling wheel axle, in which the maximum distance should be 0.5 thread pitch to 1 thread pitch of a corresponding thread of the rolling wheel pipe thread forming portion, preferably, 0.5, 0.6, 0.7, 0.8, 0.9, or 1 pitch. The rolling wheel pipe thread forming portion refers to threads of rolling wheel body corresponding to pipe threads produced by desired rolling. The radial movement space refers to the movement space of the rolling wheel body along the direction perpendicular to the axis of the cylindrical pipe blank to be processed. The radial movement space should be understood as the maximum distance of the rolling wheel body pipe forming portion capable of moving freely along the direction perpendicular to the axis of the cylindrical pipe blank to be processed relative to cylindrical pipe blank prior to processing. The maximum distance should not exceed 0.5 thread pitch of the corresponding thread of the rolling wheel pipe thread forming portion, preferably, 0.1, 0.2, 0.3, 0.4, or 0.5 pitch.

Pitch of the present invention is determined depending on specific pipe threads with different dimensions and sizes. Specific thread pitch of rolling wheel is adjusted accordingly as determined by national standards GB/T12716 (NPT), GB/T7306 (BSPT), GB/T7307 and the corresponding international standards.

External surface of the rolling wheel body of the present invention includes pipe thread forming portion. The rolling wheel pipe thread forming portion refers to threads corresponding to pipe threads produced by requested rolling, may include cylindrical pipe threads or conical pipe threads. The cylindrical pipe threads and the conical pipe threads include: BSPT, NPT, Metric, and API standard cylindrical pipe threads and conical pipe threads. In addition to the pipe thread forming portion, the rolling wheel body can also include a pre-forming portion or guide portion at the starting position of cylindrical pipe blank to be processed. The starting position of cylindrical pipe blank to be processed is the first contact position between rolling wheel and pipe, when pipe threads are rolling processed. Shapes of the pre-forming portion include cylindrical surface, conical surface, cylindrical pipe thread, incomplete cylindrical pipe thread, incomplete conical pipe thread, or a combination thereof. When the pre-forming portion is cylindrical pipe thread, the tooth shape of cylindrical pipe thread is identical to the tooth shape of pipe thread forming portion. When pre-forming portion is incomplete cylindrical pipe thread or incomplete conical pipe thread, pitch of incomplete cylindrical pipe thread or incomplete conical pipe thread equals to the pitch of pipe thread forming portion thread. Tooth bottom of incomplete cylindrical pipe thread or incomplete conical pipe thread are identical to tooth bottom of pipe thread forming portion thread, and crest is relatively small. Shapes of the guide portion include conical surface, arc surface, progressive surface, or a combination thereof. Shapes of rolling wheel body and a combination thereof can refer to the following patent documents: RU2443492C1, US20120011912A1, U.S. Pat. No. 3,651,678A, CN201361668Y, JP04610375B2, JP2000176585A. The above patent documents are herein incorporated by reference.

The rolling head includes N number of circular thread rolling wheels, pitch axial length of a first incomplete pitch thread of each rolling wheel is set as follows:
a) setting any one of the rolling wheels as the first rolling wheel having a pitch axial length of the first incomplete pitch thread equal to a pitch thereof;
b) sequentially decreasing 1/N pitch of the pitch axial length of the first incomplete pitch thread of a rolling wheel adjacent to the first rolling wheel in clockwise or counterclockwise direction until decreasing to 1/N pitch;
preferably, N is greater than 2; more preferably, N equals to 2, 3, 4, 5, 6, 7, 8, or more.

In addition, rolling wheel body can also simultaneously include, sequentially from the starting position of cylindrical pipe blank to be processed, guide portion, pre-forming portion, and pipe thread forming portion. Each part described above may be an integrated structure, or a combined structure. The combined structure refers to each part is sequentially grouped in the direction of processing cylindrical pipe blank, may be on the same rolling wheel axle, may also be grouped on different rolling wheel axle, or even grouped on different rolling heads.

The 55° conical pipe threads or 60° conical pipe threads of the present invention, respectively, correspond to conical pipe treads of appropriate national or international standards. Referenced standard conical pipe treads include BSPT, NPT, Metric, and API standard conical pipe threads. Nominal diameter of the cylindrical pipe blank of the present invention is referenced to national pipe standards «Welded Steel Pipe for Low Pressure Liquid Transport» (GB3091-2008). One skilled in the art, based on the spirit of the present invention, can reasonably set up corresponding outside diameter and wall thickness of the cylindrical pipe blank for rolling different pipe threads according to the present invention.

Figure 2:
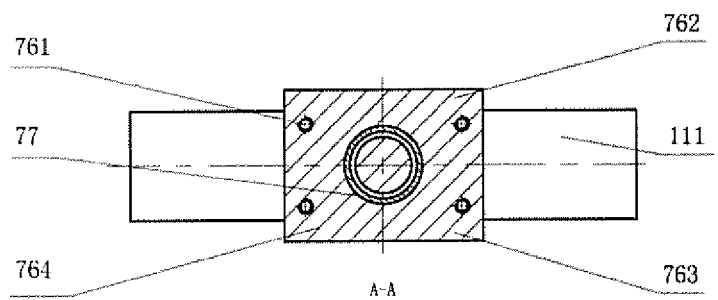
FIG. 2 is the A-A cross-sectional plan view of FIG. 1.
Figure 10:
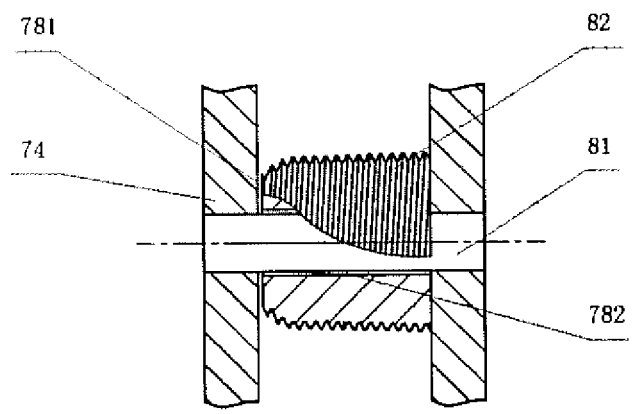
FIG. 10 is a schematic diagram of using gapless static axle hole mating, non-floating connection between rolling wheel axle and rolling wheel seat to achieve free axial and radial movement relying on floating connection between rolling wheel body and rolling wheel axle according to the present invention.

FIG. 1 shows a schematic structural view of the first embodiment of rolling head having four rolling wheels. An A-A sectional plan view is shown in FIG. 2. The rolling head 7 in FIG. 1 includes: spring 77 connected with positioning plate 111 on sliding seat 11 and adjustment screw 76. Spring 77 mainly acts to floatingly connect rolling head 7 with sliding seat 11. Adjustment screws 761, 762, 763 and 764 can control left and right, up and down, front and back floating margins of rolling head 7. Upper rolling wheel seat 74 can be moved up and down by applying external force to handle 71 through screw 72 to adjust rolling cylindrical pipe blank 5 with different diameters and to place rolling head 7 at operating position or at non-operating position. Fixed lower rolling wheel seat 75 and four rolling wheels 8 mounted on upper and lower rolling wheel seats 74, 75 are equally distributed along the circumferential direction. Rolling wheel body 82 and rolling wheel axle 81, as shown in FIG. 10, are mated through axle hole and have axial movement space 781 with half a pitch to one pitch of rolling wheel and radial movement space 782 having half a pitch. The axial and radial gaps ensure that the starting angle of each rolling wheel 8 sequentially enters the rolling cylindrical pipe blank processing at a correct angle, so that the four rolling wheels can freely match teeth according to the most efficient working principles at an initial rolling tooth-matching stage, and greatly reduce the impact of rolling on ellipticity of the cylindrical pipe blank.

In practice, first, insert cylindrical pipe blank 5 into hollow main shaft 21 of transmission device 20 located on top of power motor 2 and clamping device 4, reach inside rolling trimming device 6, and manually rotate to clamp. Cylindrical pipe blank 5 tightly clamped by clamping device 4 is rotary driven by power motor 2 and transmission device 20 and is cut to desired length by manual rotary trimming in rolling trimming device 6. Turn off power motor switch 3. Manually reverse rotate handle of rolling trimming device 6 to loosen cylindrical pipe blank 5 and complete trimming. Manually rotate handle 71 on rolling head 7 and open by moving upper rolling wheel seat 74 upward. Move crank 10 of sliding seat to position rolling head 7 on rolling seat 11 to mutual working location with cylindrical pipe blank 5. Manually rotate handle 71 on rolling head 7 to move rolling wheels 8 of upper rolling wheel seat 74 downward for initial tooth-matching with cylindrical pipe blank 5. Turn on power motor switch 3. Under the effect of rolling wheels 8, cylindrical pipe blank 5 is progressively rolled into conical pipe thread product. Power motor stops and reverses rotation, when photoelectric sensor 741 located on lower rolling wheel seat 75 senses contact. At this time, the operator is prompted. Reverse rotate handle 71 of rolling head 7 and release by moving upper rolling wheel seat 74 upward, quickly release cylindrical pipe blank 5 from rolling head 7, and complete rolling. According to processing need, move crank 10 of sliding seat to move chamfering device 9 to operating position and perform chamfering on cylindrical pipe blank 5.

Figure 3:
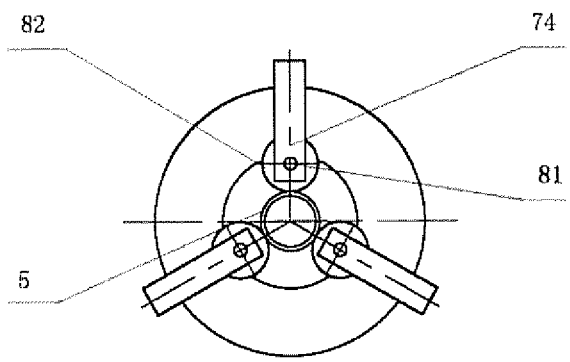

FIG. 3 is a structural schematic view of a second preferred embodiment of the present invention, including rolling head having three rolling wheels.

The rolling head includes: three rolling wheel seats 74 equally distributed in the circumferential direction. Rolling wheel seats 74 are moved synchronously in the radial direction by pneumatic or hydraulic or servo motor to adjust rolling cylindrical pipe blanks 5 having different diameters and to position rolling head 8 at operating position or non-operating position and, at the same time, to adjust different rolling force to accommodate different cylindrical pipe blank materials. The rest is same as the above.

Figure 4:
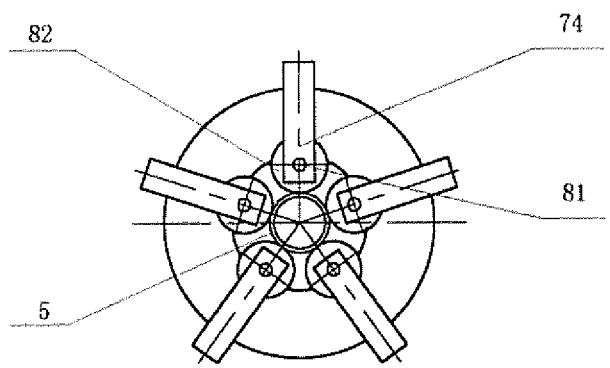

FIG. 4 is a structural schematic view of a third preferred embodiment of the present invention, including rolling head having five rolling wheels.

The rolling head includes: five rolling wheel seats 74 equally distributed in the circumferential direction. Rolling wheel seats 74 are moved synchronously in the radial direction by pneumatic or hydraulic or servo motor to adjust rolling cylindrical pipe blanks 5 having different diameters and to position rolling head at operating position or non-operating position and, at the same time, to adjust different rolling force to accommodate different cylindrical pipe blank materials. The rest is same as the above.

Although the present invention has been described in the preferred embodiments shown above, but they are not intended to limit the present invention. One skilled in the art should be able to make various equivalent changes or substitutions without departing from the spirit and scope of the present invention. For example: rolling head structure may also be that of any corresponding rolling device involved in the patents listed below or a combination thereof: U.S. Pat. Nos. 5,699,691A, 3,058,196A, EP282889A2, U.S. Pat. Nos. 3,452,567A, 3,058,196A, US20060162411A1, JP10034270A, JP10244340A, JP2003126937A, JP9327742A, CN100542735C, CN2555962Y, SU1344479A1, US20120011912A1, U.S. Pat. Nos. 4,617,816A, 4,785,649A, 5,870,918A, GB 1150525A, JP1273637A, SU703197A1.

The way to inform operator that rolling is complete may be mechanical contact or light display. Opening or closing rolling trimming device and moving upper rolling wheel seat can be done by pneumatic or hydraulic or servo motor. Number of rolling wheel in the rolling wheel seat can be two, three, five, or more than five. Radial operating mode of rolling wheel seat work 74 depends on different type, size, wall thickness, and pipe thread tooth shape of steel pipe. PLC or CNC may be used to control moving speed of rolling wheel seat 74 and rolling force, so that roundness deformation of cylindrical pipe blank is at the least and pipe thread teeth at the best. Rolling wheel body 82 of rolling wheel 8 may be circular threads or helical threads.

Figure 5:
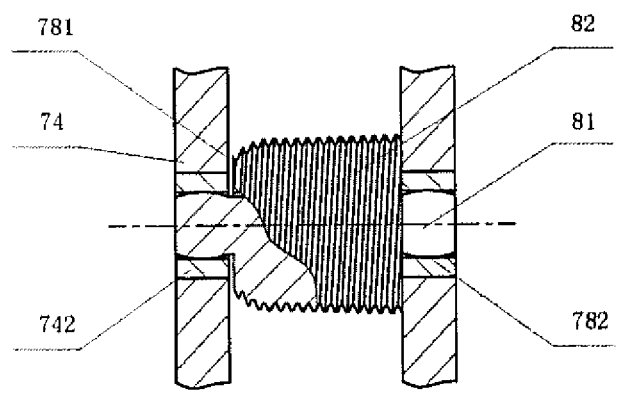
FIGS. 5-7 are schematic diagrams of axial and radial movement spaces of floating connection achieved by using axle hole between rolling wheel having rolling wheel body and rolling wheel axle formed as an integral part and rolling wheel seat according to the present invention.
Figure 6:
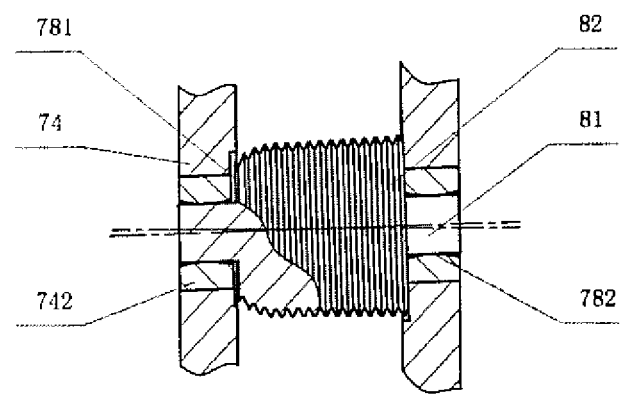
Figure 7:
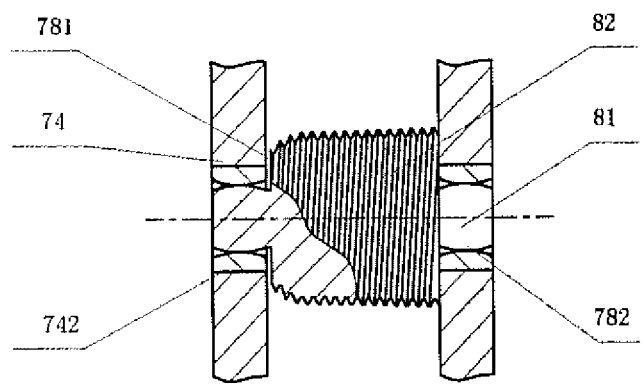

FIGS. 5-7 are schematic diagrams of axial and radial movement spaces of floating connection achieved using axle hole mating between rolling wheel having rolling wheel body integrated with rolling wheel axle and rolling wheel seat.

In which, each drawing illustrates rolling body 82 is disposed at axle sleeve 742 of rolling wheel seat 74 through two ends of rolling wheel axle 81. Labels 781, 782 indicate axial gap and radial gap, respectively.

FIG. 5 shows axial and radial movement spaces, i.e., axial gap and radial gap 781, 782, formed by floating connection achieved by axle hole mating between two convex arc-shaped axle column ends of helical rolling wheel body 82 and cylindrical hole of rolling wheel seat 74.

FIG. 6 shows axial and radial movement spaces, i.e., axial gap and radial gap 781, 782, formed by floating connection achieved by axle hole mating between two cylindrical axle column ends of circular rolling wheel body 82 and convex arc-shaped hole of rolling wheel seat 74.

FIG. 7 shows axial and radial movement spaces, i.e., axial gap and radial gap 781, 782, formed by floating connection achieved by axle hole mating between two convex arc-shaped axle column ends of helical rolling wheel body 82 and convex arc-shaped hole of rolling wheel seat 74.

All the above structures use integral rolling wheel, i.e., rolling wheel axle 81 and rolling wheel body 82 are an integrally molded structure. The greatest advantage of using integral rolling wheel is that rolling wheel diameter is not affected by inner hole diameter of rolling wheel body 82 and diameter of axle 81. Thus, rolling wheel diameter can be very small, such as: 10 mm, or even smaller. This creates technical requirements for increasing the number of rolling wheels in rolling head.

Figure 8:
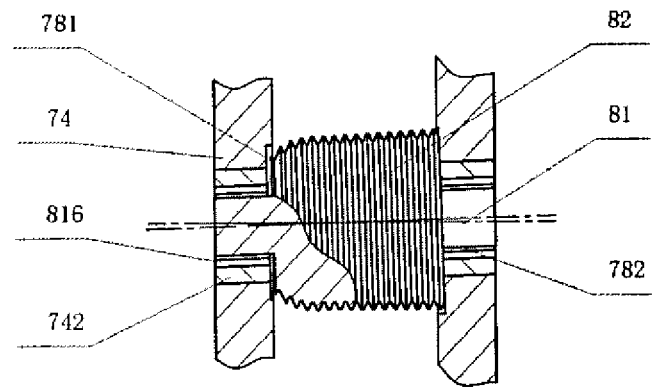
FIG. 8 is schematic diagram of axial and radial movement spaces of floating connection achieved by using axle bearing between rolling wheel with rolling pins (axle bearing) at two ends and having circular thread rolling wheel body and rolling wheel axle formed as an integral part and axle bearing hole of rolling wheel seat according to the present invention.

FIG. 8 is a structural schematic diagram of axial and radial movement spaces of floating connection achieved by using rolling pin axle bearing mating between two ends equipped with rolling pin axle bearings of rolling wheel having circular rolling wheel body integrated with rolling wheel axle and axle bearing hole of rolling wheel seat. In the drawings, difference between FIG. 8 and FIG. 7 is that, using rolling pin axle bearing 816 on rolling wheel seat 74, use of rolling pin axle bearing 816 may greatly improve sliding rotation effect between rolling wheel axle 81 and hole of rolling wheel seat 74.

Figure 9:
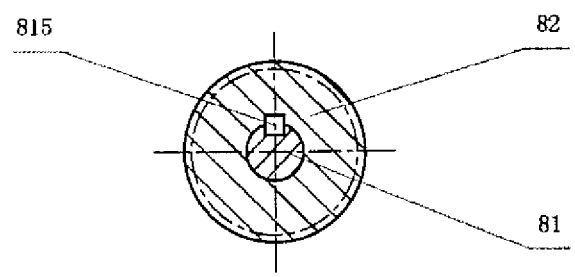
FIG. 9 is a schematic diagram of an alternative of rolling wheel body integrally molded with rolling wheel—(flat) key-groove mated according to the present invention.

FIG. 9 is a schematic diagram of an alternative of rolling wheel body 82 integrated with rolling wheel axle 81 of the present invention, i.e., use of (flat) key-groove 815 mating, according to the present invention.

FIG. 10 shows non-floating connection using gapless axle hole static mating between rolling wheel axle 81 and rolling wheel seat 74, depending on floating connection between rolling wheel body 82 and rolling wheel axle 81 to achieve free axial and radial movement, according to the present invention.

Figure 11:
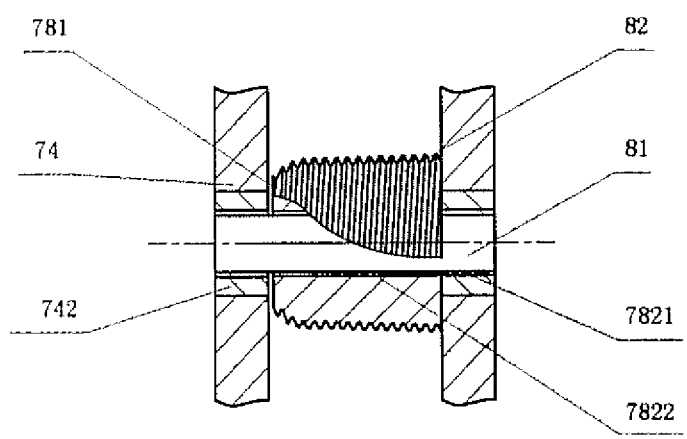
FIG. 11 is a schematic diagram of using gapped axle hole mating connection, but non-floating connection between rolling wheel axle and rolling wheel seat to achieve free axial and radial movement mainly relying on floating connection between rolling wheel body and rolling wheel axle according to the present invention.

FIG. 11 shows gapped axle hole mating connection, but not floating connection, between rolling wheel axle 81 and rolling wheel seat 74, mainly depending on floating connection between rolling wheel body 82 and rolling wheel axle 81 to achieve free axial and radial movement, which illustrates radial gaps 7821, 7822 at two locations: between rolling wheel body 82 and rolling wheel axle 81, and between rolling wheel axle 81 and rolling wheel seat 74, according to the present invention.

Figure 12:
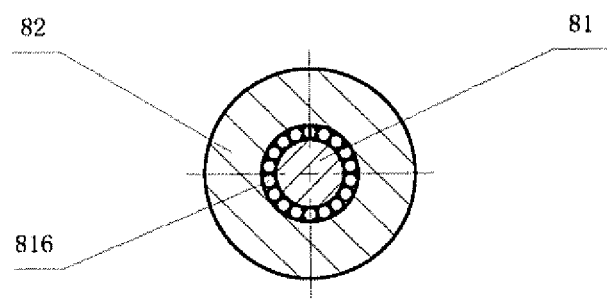
FIGS. 12-13 are schematic diagrams of using rolling pin (axle bearing) floating connection between rolling wheel body and rolling wheel axle to achieve free axial and radial movement according to the present invention.
Figure 13:
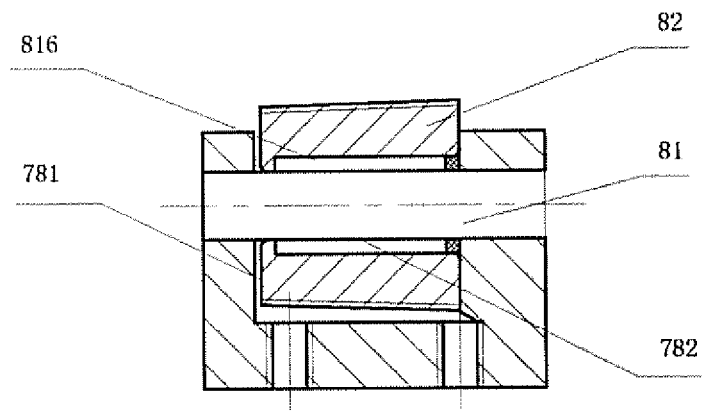

FIGS. 12-13 show, according to FIG. 8, rolling wheel body 82 and rolling wheel axle 81 use rolling pin (axle bearing) floating connection mating to achieve free axial and radial movement. Using rolling pin (axle bearing) 816 may greatly improve sliding rotation effect between rolling wheel body 82 and rolling wheel axle 81, according to the present invention.

Figure 14:
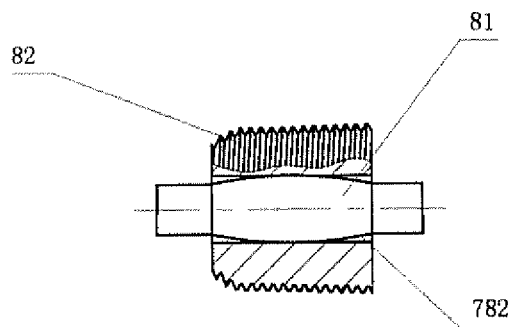
FIGS. 14-16 are schematic diagrams of using three axle hole mating floating connections between rolling wheel body and rolling wheel axle to achieve free axial and radial movement spaces according to the present invention.
Figure 15:
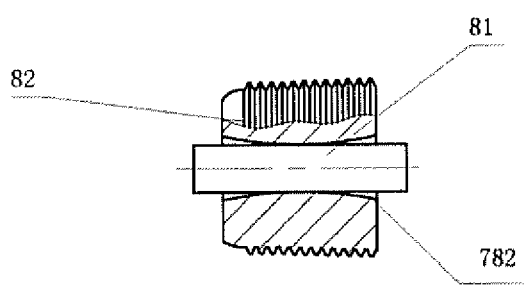
Figure 16:
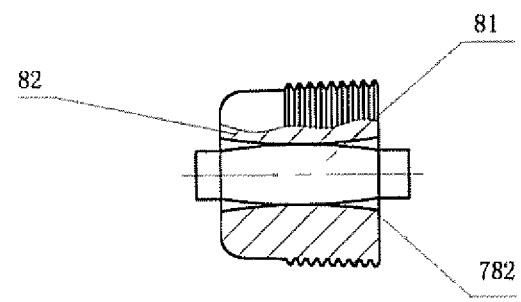

FIGS. 14-16 show three types of axle hole mating floating connection of rolling wheel body 82 and rolling wheel axle 81 to achieve free axial and radial movement spaces, which illustrates radial gap 782, according to the present invention.

In which, FIG. 14 shows middle portion of rolling wheel axle 81 is convex arc-shaped structure. Inner hole of helical roll wheel body 82 is cylindrical structure.

FIG. 15 shows rolling wheel axle 81 is cylindrical structure. Inner hole of circular rolling wheel body 82 is convex arc-shaped structure.

FIG. 16 shows middle portion of rolling wheel axle 81 is convex arc-shaped structure. Inner hole of circular rolling wheel body 82 is also convex arc-shaped structure.

Figure 17:
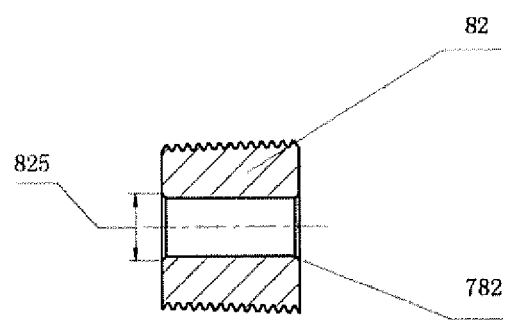
FIGS. 17-18 show schematic diagrams of structure of thread forming portion of rolling wheel body can be conical pipe threads or cylindrical pipe threads, respectively, according to the present invention.
Figure 18:
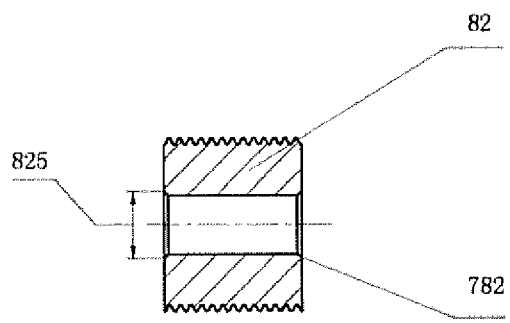

FIGS. 17 and 18 show thread forming portions of rolling wheel bodies of the present invention have conical pipe thread structure and cylindrical pipe thread structure, respectively. In which, 825 is the diameter of two end holes of rolling wheel body and is equal to the diameter of the rolling wheel axle plus 0.5 to 1 pitch of corresponding rolling wheel thread to form radial movement space.

FIGS. 19-23 are schematic diagrams of detailed illustrations of three parts of rolling wheel body 82 of the present invention, respectively: various combinations of guide portion A, pre-forming portion B, and conical pipe thread forming portion C, according to the present invention.

Figure 19:
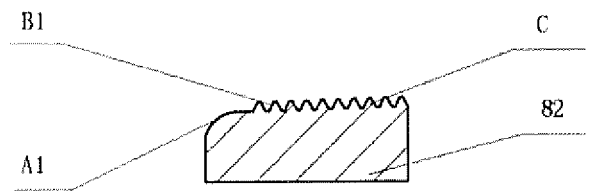
FIGS. 19-23 are schematic diagrams of detailed illustration of three parts of rolling wheel body, namely: various combinations of guide portion, preforming portion, and conical pipe thread forming portion according to the present invention.

In which, FIG. 19 is an integrally combined structure of guide portion A1 having convex arc-shaped surface, cylindrical pipe thread pre-forming portion B1, and conical pipe thread forming portion C on rolling wheel body 82.

Figure 20:
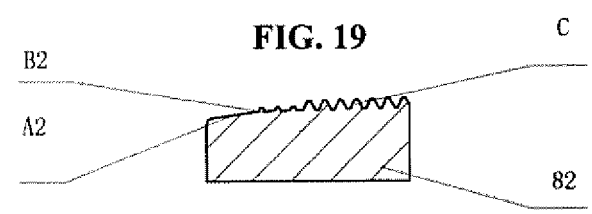

FIG. 20 is an integrally combined structure of guide portion A2 having conical surface, incomplete conical pipe thread pre-forming portion B2, and conical pipe thread forming portion C on rolling wheel body 82.

Figure 21:
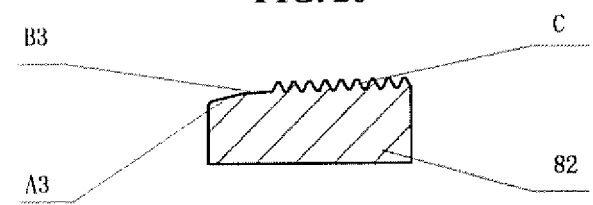

FIG. 21 is an integrally combined structure of rolling wheel body 82 including guide portion A3 having progressive surface, cylindrical surface pre-forming portion B3, and conical pipe thread forming portion C.

Figure 22:
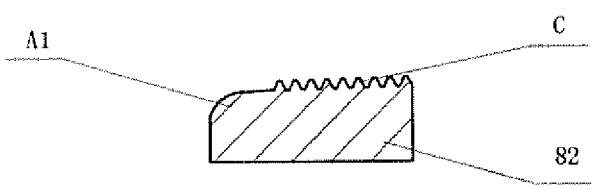

FIG. 22 is an integrally combined structure of rolling wheel body 82 including guide portion A1 having convex arc-shaped surface and conical pipe thread forming portion C.

Figure 23:
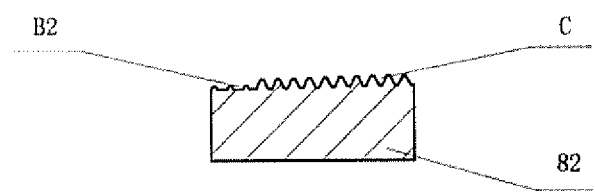

FIG. 23 is an integrally combined structure of rolling wheel body 82 including incomplete cylindrical pipe thread pre-forming portion 84 and conical pipe thread forming portion C.

Figure 24:
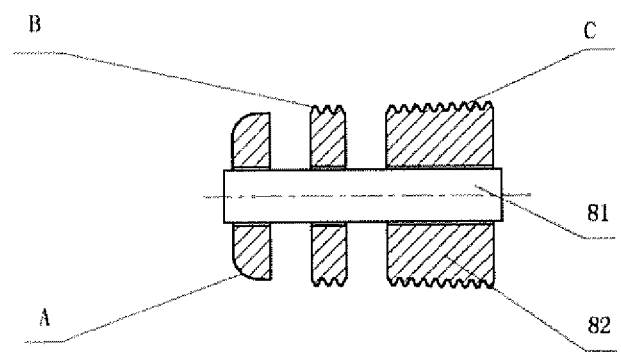
FIG. 24 is a schematic diagram of three parts of rolling wheel body: guide portion, preforming and pipe thread forming portions in sub-structure form according to the present invention.

FIG. 24 is a schematic diagram of three part sub-structure of rolling wheel body 82 of the present invention, i.e., guide portion A, pre-forming portion B, and conical pipe thread forming portion C, sequentially separated on rolling wheel axle 81 to form rolling wheel body 82.

Figure 25:
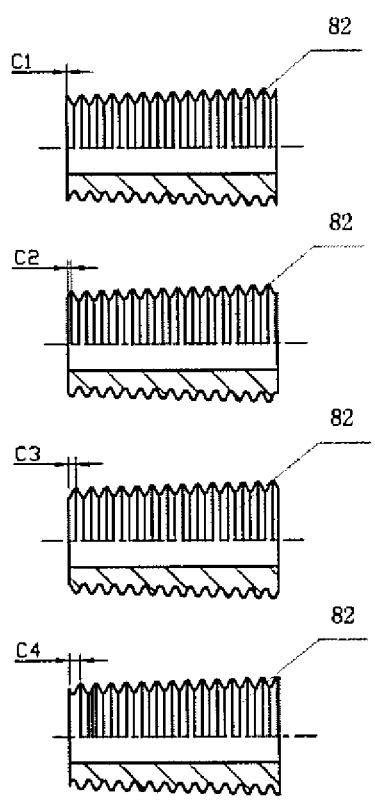
FIGS. 25 and 26 are schematic diagrams of axial and radial distribution manner in four rolling wheels of circular thread rolling head according to the present invention.
Figure 26:
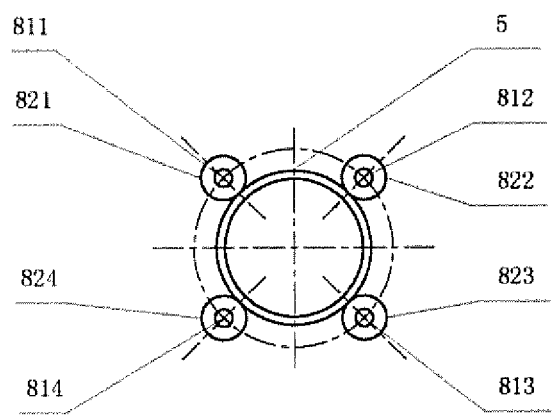

FIGS. 25 and 26 are schematic diagrams of axial and radial distributions of four rolling wheels of circular thread rolling head according to the present invention.

In which, FIG. 25 is a schematic diagram of progressive changes of pitch axial length of first thread of four circular thread rolling wheel bodies 82, in which the pitch axial length value C1 of the first incomplete pitch thread of the first rolling wheel body 82 is 0, the pitch axial length value C2 of the first incomplete pitch thread of the second rolling wheel body is ¼, the pitch axial length value C3 of the first incomplete pitch thread of the third rolling wheel body is ½, the pitch axial length value C4 of the first incomplete pitch thread of the fourth rolling wheel body is ¾.

FIG. 26 is a schematic diagram of radially distributed four rolling wheel axles 821~824. Cylindrical pipe blank 5 is in the middle.

Figure 27:
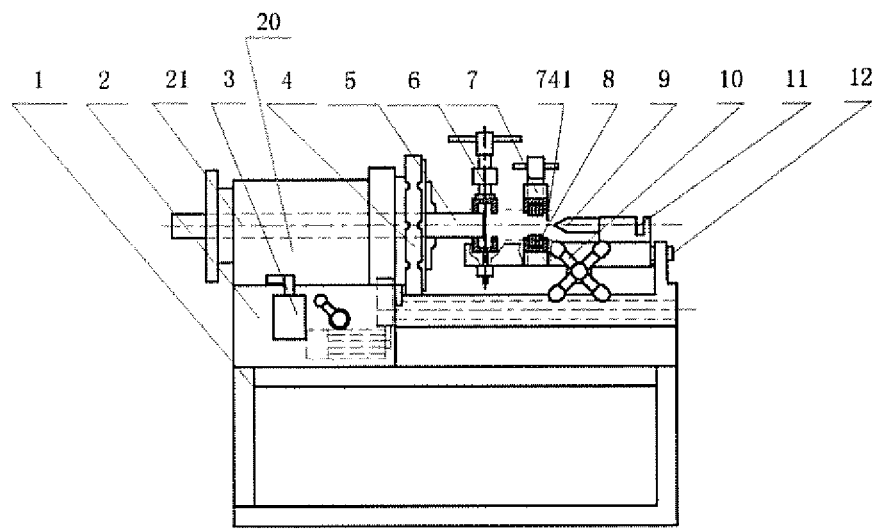
FIGS. 27 and 28 include front view and side view of rolling apparatus having rolling head according to the present invention.
Figure 28:
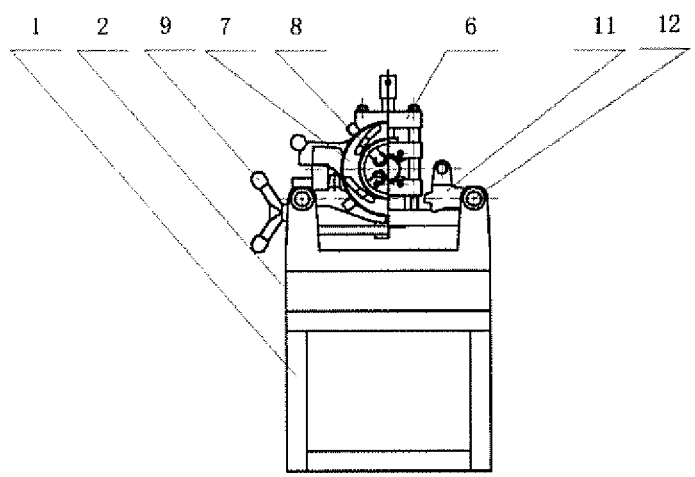

FIGS. 27 and 28 are front view and side view of rolling apparatus having rolling head of the present invention.

The rolling apparatus includes: base 1, power motor 2, transmission device 20 and hollow main shaft 21, cylindrical pipe blank clamping device 4, motor switch 3, two axial guide columns 12, sliding seat 1, the rolling head 7 and photoelectric sensing device 741. A power motor 2, transmission device 20, and a motor switch 3 are disposed at one side of top portion of base 1. A hollow main shaft 21 is disposed inside transmission device 20 on top of power motor 2. Transmission device 20 connects main shaft of power motor with hollow main shaft 21. Top portion of base 1 also includes clamping device 4 for clamping and rotating cylindrical pipe blank to be processed. Clamping device 4 and hollow main shaft 21 are integrally and coaxially connected. Two axial guide columns 12 are disposed at another side of the top portion of base 1, and are disposed before and after in parallel with centerline axis of hollow main shaft 21. Sliding seat 11 is disposed at the two axial guide columns 12 and is capable of horizontally sliding along the axial guide columns 12 by rotating sliding seat crank 10. Rolling head 7 is floatingly disposed at sliding seat 11, and is coaxial with centerline axis of hollow main shaft 21. Photoelectric sensing device 741 is disposed at lower rolling wheel seat 74 of rolling head 7. Photoelectric sensing device 741 is connected with power motor through PLC program. Rolling apparatus of the present invention further includes a chamfering device 9 and/or a rolling trimming device 6. Chamfering device 9 is floatingly disposed at sliding seat 11 relative to one side of power motor and transmission device 2 and is coaxial with axis of hollow main shaft 21. Rolling trimming device 6 is disposed at sliding seat 11 relative to one side of power motor and transmission device 2 and is coaxial with axis of hollow main shaft 21.

Rolling head of the present invention can be used not only in the above-described rolling apparatus, one skilled in the art, based on the spirit of the present invention through modification, can also apply to conventional rolling thread apparatus and techniques and any corresponding rolling apparatus or a combination thereof involved in the patents listed below: U.S. Pat. No. 4,771,625A, JP1273637A, CN102198590A, CN202316603U, CN103264128A, CN1251821C, and CN201310058101 X.

Figure 29:
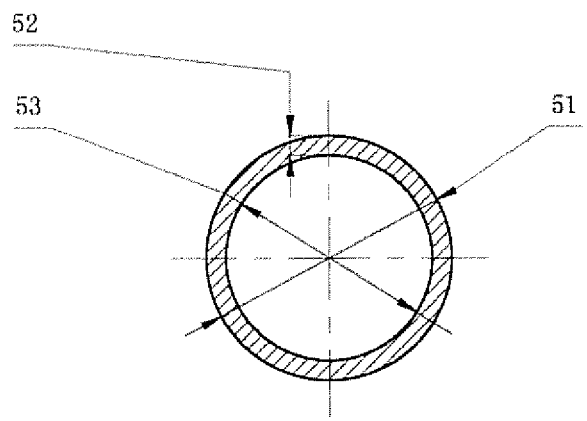
FIG. 29 is a schematic diagram of outside diameter size of cylindrical pipe blank used in rolling apparatus according to the present invention.

FIG. 29 is a schematic diagram of cylindrical pipe blank 5 used in rolling apparatus of the present invention.

Figure 30:
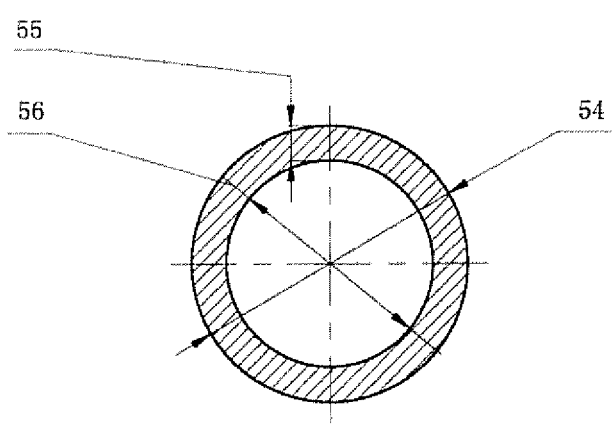
FIG. 30 is a schematic diagram of outside diameter size of cylindrical pipe blank used in prior art apparatus.

FIG. 30 is a schematic diagram of outside diameter size of cylindrical pipe blank used in conventional rolling apparatus.

In which, outside diameter size of cylindrical pipe blank 5 in FIG. 29, 51 is outside diameter of cylindrical pipe blank of the present invention. 52 is wall thickness of cylindrical pipe blank of the present invention. 53 is inside diameter of cylindrical pipe blank of national standards.

FIG. 30 is outside diameter size of a cylindrical pipe blank used in conventional apparatus. 54 is outside diameter of conventional cylindrical pipe blank of national standards. 55 is wall thickness of conventional cylindrical pipe blank of national standards. 56 is inside diameter of conventional cylindrical pipe blank of national standards.

Significance of the present invention: comparing FIGS. 29 and 30, we can find both inside diameters 53 and 56 of cylindrical pipe blanks 5 are the same. But, outside diameter 51 and wall thickness 52 of cylindrical pipe blanks with certain outside diameter of the present invention are smaller than outside diameter 54 and wall thickness 55 of standard cylindrical pipe blanks of cutting technology or conventional pipe thread rolling technology. That is, the present invention provides a possibility of saving steel pipe materials.

To further illustrate huge economic and technical superiority of the present invention, the following is GB 550 pipe threads by cutting GB 6 points DN20 (outside diameter 26.67 mm, inside diameter 21.07 mm, wall thickness 2.80 mm) Q235 galvanized cylindrical pipe blank in contrast with GB 550 pipe thread by rolling GB 6 points DN20 (outside diameter 25.86 mm, inside diameter 21.07 mm, wall thickness 2.39 mm) Q235 galvanized cylindrical pipe blank.

Thread tooth height of DN20 GB 55° pipe is 1.162 mm. Thread length (9 teeth) is 16.33 mm. Maximum loss of cutting taper (1:16) at initial segment of pipe thread is 0.4 mm. Minimum loss of taper (1:16) at terminal tooth of pipe thread (incomplete thread tooth) is 0.164 mm. Totaling losses of taper (1:16) and cutting tooth height, pipe having original wall thickness of 2.80 mm is thinned to 1.238 mm (1.238 mm=2.80 mm−1.162 mm−0.4 mm) and 1.474 mm (1.474 mm=2.80 mm−1.162 mm−0.164 mm), respectively. That is, thickness of the thickest wall in pipe thread segment (pipe thread terminal incomplete portion) after cutting is only 1.474 mm, and thickness of the thinnest wall of pipe thread segment after cutting is only 1.238 mm. According to safety principle design, special gas pipe having 2.80 mm wall thickness after cutting is actually used according to the thinnest pipe wall thickness of 1.238 mm with a theoretical maximum working pressure of only about 13.1 MPa [calculation method: (2×0.6×235×1.238)/26.67≈13.1 MPa]; as compared with pressure bearing capacity of 29.61 MPa of original DN20 steel pipe having 2.80 mm wall thickness [calculation method: (2×0.6×235×2.8)/26.67≈29.61 MPa], decreased by 55.765% [calculation method: (29.61−13.1)/29.61≈55.76%].

In contrast, rolling pipe thread of the present invention uses the same 6 points DN20 Q235 galvanized cylindrical pipe blank. Outside diameter becomes 25.86 mm (inside diameter remains 21.07 mm, pipe wall thickness is 2.39 mm): according to calculation and actual situation, linear mass of nominal unit of pipe thread segment after rolling is not changed. "Wall thickness" after rolling is the same as "wall thickness of 2.39 mm" of original pipe. According to the above formula, we can calculate the theoretical maximum working pressure to be about 26.06 MPa. [Calculation method: (2×0.6×235×2.39)/25.86=26.06 MPa]. Theoretical maximum working pressure of rolling pipe thread or pipe joint of same DN20 steep pipe of the present invention is approximately greater than percentage of that of pipe thread or pipe joint having wall thickness of 2.80 mm [calculation method: (26.17−13.1)/13.1≈99.77%], while saving about 12.65% of steel [calculation method: as confirmed by DN20 national standards, unit weight of steel pipe having wall thicknesses of 2.8 mm and 2.4 mm are 1.66 and 1.45 kg per mm, respectively, [(1.66−1.45)/1.66≈12.65%].

As mentioned above, based on improved percentage of pressure bearing capacity of pipe thread of the present invention, cost of materials decreases by 13%, instead.

Another embodiment further describes in detail specific processing steps in combination of FIGS. 1, 27, 28, 29, and 30, and the calculation formula, as follows.

According to current national standards ((Low Pressure Liquid Delivery Using Welded Steel Pipe o (GB3091-2008), for DN32 gas-specific galvanized steel pipe, outside diameter is 42.40 mm, general wall thickness 3.50 mm, inside diameter 35.40 mm. Use of current technique to cut 55° pipe thread, tooth height is 1.479 mm, pipe thread length (11 teeth) 25.40 mm. Combining tooth height and taper cutting losses, steep pipe wall thickness decreases from original 3.50 mm to about 1.50 mm, while inside diameter 56 remains unchanged. Use of current rolling pipe thread technology, large-tonnage of axial punching equipment is used, first processing 1:16 conical surface; followed by using conical rolling wheel to process pipe thread products. But, it causes the following problems:

1. Inside diameter narrowing amount of pipe thread is 3.11 mm. Smallest steep pipe inside diameter is 32.29 mm after processing using current rolling technique. Percentage of steep pipe inner hole narrowing is 8.8%, which is far greater than 3.4% steep pipe inner hole narrowing allowed by national and international standards.

2. It is impossible that large-tonnage of axial punching equipment specifically for conical surface processing to be installed at each pipe network installation site.

3. Punching pressure in forming conical surface may cause unapparent and apparent damages to pipe materials, especially, intersections between original outside diameter of steel pipe and conical surface, leaving safety risk to rolling pipe thread products.

To this end, a rolling head for rolling pipe thread, apparatus thereof, and cylindrical pipe blank processed by the apparatus of the present invention are used. First, place DN32 having outside diameter 41.17 mm of steel pipe blank 5 with certain diameter of the present invention into clamping device 4 according to processing length requirement and tighten manually. Then, manually embed an already turned-on rolling trimming device 6 into cylindrical pipe blank 5. Turn on motor switch 3 to rotate cylindrical pipe blank. Manually rotate handle to radially feed trimming rolling wheel in rolling trimming device 6 according to processing requirement. Rolling cuts cylindrical blank 5 from a length of 6000 mm to a desired length of 2750 mm. Manually reverse rotate handle. Open rolling trimming device. Use crank 10 to manually remove rolling trimming device 6 located on sliding seat 11 to complete rolling trimming process. Turn off motor switch 3.

During pipe thread processing, according to rolling processing need, floating chamfering apparatus 9 can be used together. Use crank 10 to manually push chamfering device 9 axially feeding inner hole of a steel pipe 5 end. Turn on motor. Start chamfering. Clench crank 10. Complete chamfering according to processing need. Turn off motor.

Manually rotate handle 71 on rolling head to open rolling head 7. Use crank 10 to manually push pipe thread rolling head 7 axially to processing position. Reverse rotate handle 71 to make rolling wheel 8 contact cylindrical pipe blank 5. Turn on motor. Start pipe thread rolling. By rolling axial force, pipe thread rolling head 7 feeds automatically along the axial direction of motor. When rolling wheel 8 of rolling head 7 on sliding seat 11 axially moves to head portion of pipe thread, photoelectric sensing device 741 activates. Motor reverses. Pipe thread rolling head axially moves back. Manually reverse rotate handle 71. Quickly push open rolling head 7 in the axial direction. Turn off motor switch 3. Complete rolling product processing.

In comparison, differences between a rolling head for rolling pipe threads, apparatus thereof, and cylindrical pipe blank processed by the apparatus of the present invention and prior art manufacturing apparatus, methods for producing conical pipe thread products are obvious. Thus, beneficial effects are:

1. Saving the step of axial punching used in current rolling pile thread technology and basically similar to currently 100% used cutting and threading processing steps. Processing apparatus is simple and light in line with current operating practices, easy to widely promote use.

2. Use of rotary rolling process to progressively complete pipe thread processing avoids unapparent and apparent damages to steel pipe body, especially welded pipe and welded seam, increases thread density, thread connection strength and seal safety performance, while improving concentricity of pipe thread products.

3. Inner hole narrowing amounts of pipe thread products are in line with current international and national standards.

4. As compared with currently 100% use of cutting and threading processing pipe threads, steel pipe unit length weight of pipe thread products formed by rolling and original steel pipe unit length weight prior to rolling are the same. Affected by cold hardening effect of rolling, pressure bearing capacity increases about 100%, as compared with corresponding standard cutting pipe thread products.

5. Obviously, on the basis of improved pipe thread connection safety of the present invention, decreasing steel pipe outside diameter and wall thickness can be explored, thereby reducing amount of steel used in steel pipe, to achieve environmental protection purposes of saving energy and reducing emission.

Although the present invention has been described in preferred embodiments shown above, they are not intended to limit the present invention. One skilled in the art should be able to make various equivalent changes or substitutions and not limited by steel pipe type, size, and pipe thread tooth shape, without departing from the spirit and scope of the present invention. For example: seamed and seamless stainless steel pipes, seamed and seamless black iron pipes and other steel pipe materials, whose outside diameter may be within certain range with upper and lower deviations, wall thickness can be thinned further. With regard to outside diameter of cylindrical pipe blank for rolling processing 55° and 60° pipe threads is calculation methods of claim 19 and values of claim 20. With regard to Metric pipe threads, or other standard external pipe threads (for example, oil API pipe threads, special aerospace pipe screw), or other non-1:16 conical pipe threads and cylindrical pipe blank greater than DN150. There are differences in outside diameter calculation methods for rolling cylindrical pipe blank and test data, and should be adjusted by the spirit and principles of the present invention. Of course, for steel pipes with better quality, especially seamless steel pipe, whose outside diameter size and wall thickness can be properly calibrated by adjusting the rolling head of the present invention with suitable rolling force and rolling time for rolling desired cylindrical and conical pipe thread products. In the meantime, rolling head is not affected by the structure, rotating and moving direction of the rolling head apparatus. For example, the structure according to claim 17, i.e., the upper rolling wheel seat is sliding and the lower rolling wheel seat is fixed, may be that both upper and lower rolling wheel seats are capable of sliding or that the lower rolling wheel seat is sliding and the upper rolling wheel seat is fixed. Upper and lower rolling wheel seats can be set up as left and right rolling wheel seats. Accordingly, scope of the present invention should depend on the scope defined by the appended claims in the present application.

The invention claimed is:

1. A rolling head for rolling pipe threads, comprising:
at least two rolling wheels and
a rolling wheel seat for positioning the rolling wheels,
wherein each rolling wheel comprises:
a rolling wheel body and
a rolling wheel axle,
wherein the rolling wheel body comprises a rolling wheel pipe thread forming portion, characterized in that, an axial movement space is present in a direction along the rolling wheel axle of b the rolling wheel relative to the rolling wheel seat, an axial distance of the axial movement space is 0.5 thread pitch to 1 thread pitch of threads of the rolling wheel pipe thread forming portion,
wherein a shape of the pipe thread forming portion is a conical pipe thread,
wherein the rolling wheel body is capable of moving freely along the axial direction of the rolling wheel axle,
wherein a first end of the rolling wheel body further comprises an unthreaded guide portion,
wherein a pre-forming portion of the rolling wheel body is axially disposed between the pipe thread forming portion of the rolling wheel body and the unthreaded guide portion, and
wherein a shave of the unthreaded guide portion of the rolling wheel body is an are surface and a shape of the pre-forming portion is a cylindrical pipe thread.

2. The rolling head for rolling pipe threads according to claim 1, characterized in that, a radial movement space is present in a radial direction along the rolling wheel axle of the rolling wheel relative to the rolling wheel seat, a radial distance of the radial movement space is no more than 0.5 thread pitch of the threads of the rolling wheel pipe thread forming portion.

3. The rolling head for rolling pipe threads according to claim 2, characterized in that, the axial movement space and the radial movement space are achieved through a structure selected from the group consisting of:
a) a floating connection between the rolling wheel and the rolling wheel seat;
b) a floating connection between the rolling wheel body and the rolling wheel axle;
c) a combination of a) and b); and
the floating connection is selected from: an axle hole floating connection or an axle bearing floating connection.

4. The rolling head for rolling pipe threads according to claim 3, characterized in that, the axle hole floating connection comprises:

a) a contact connection of any arc surface or all arc surfaces between an axle hole surface of the rolling wheel body and the rolling wheel axle; or
b) a contact connection of any arc surface or all arc surfaces at an axle hole connection site between the rolling wheel axle and the rolling wheel seat; or
c) a contact connection of the axle hole surface of the rolling wheel body and a surface of the rolling wheel axle, wherein both surfaces are cylindrical surfaces, and a diameter of an axle hole port of the rolling wheel body equals a diameter of the rolling wheel axle plus no more than 0.5 thread pitch corresponding to a rolling wheel thread; or
d) a contact connection of cylindrical surfaces at the axle hole connection site between the rolling wheel axle and the rolling wheel seat, and the diameter of the axle hole port of the rolling wheel seat equals the diameter of the rolling wheel axle plus no more than 0.5 thread pitch corresponding to the rolling wheel thread.

5. The rolling head for rolling pipe threads according to claim 3, characterized in that, the axle bearing floating connection is through a rolling pin.

6. The rolling head for rolling pipe threads according to claim 2, characterized in that, the axial movement space and the radial movement space are achieved through a floating connection between the rolling wheel and the rolling wheel seat, and the rolling wheel body of the rolling wheel and the rolling wheel axle is integrally molded or key-groove mated; and the floating connection is selected from: an axle hole floating connection or an axle bearing floating connection.

7. The rolling head for rolling pipe threads according to claim 6, characterized in that, the axle hole floating connection comprises:
a) a contact connection of any arc surface or all arc surfaces at an axle hole connection site between the rolling wheel axle and the rolling wheel seat; or
b) a contact connection of cylindrical surfaces at the axle hole connection site between the rolling wheel axle and the rolling wheel seat, and a diameter of an axle hole port of the rolling wheel seat equals to a diameter of the rolling wheel axle plus no more than 0.5 thread pitch corresponding to the rolling wheel threads.

8. The rolling head for rolling pipe threads according to claim 6, characterized in that, the axle bearing floating connection is through a rolling pin.

9. The rolling head for rolling pipe threads according to claim 1, characterized in that, the rolling head comprises N number of circular thread rolling wheels, a pitch axial length of a first incomplete pitch thread of each rolling wheel is set as follows:
a) setting any one of the rolling wheels as a first rolling wheel having the pitch axial length of the first incomplete pitch thread equal to a pitch thereof;
b) sequentially decreasing by 1/N pitch of the pitch axial length of the first incomplete pitch thread of a rolling wheel adjacent to the first rolling wheel in a clockwise or counterclockwise direction until decreasing to 1/N pitch;

wherein, N is a natural number greater than or equal to 2.

10. The rolling head for rolling pipe threads according to claim 1, characterized in that, the unthreaded guide portion, pre-forming portion, and the pipe thread forming portion are an integrated structure, or an assembled structure.

\* \* \* \* \*